UNITED STATES PATENT OFFICE.

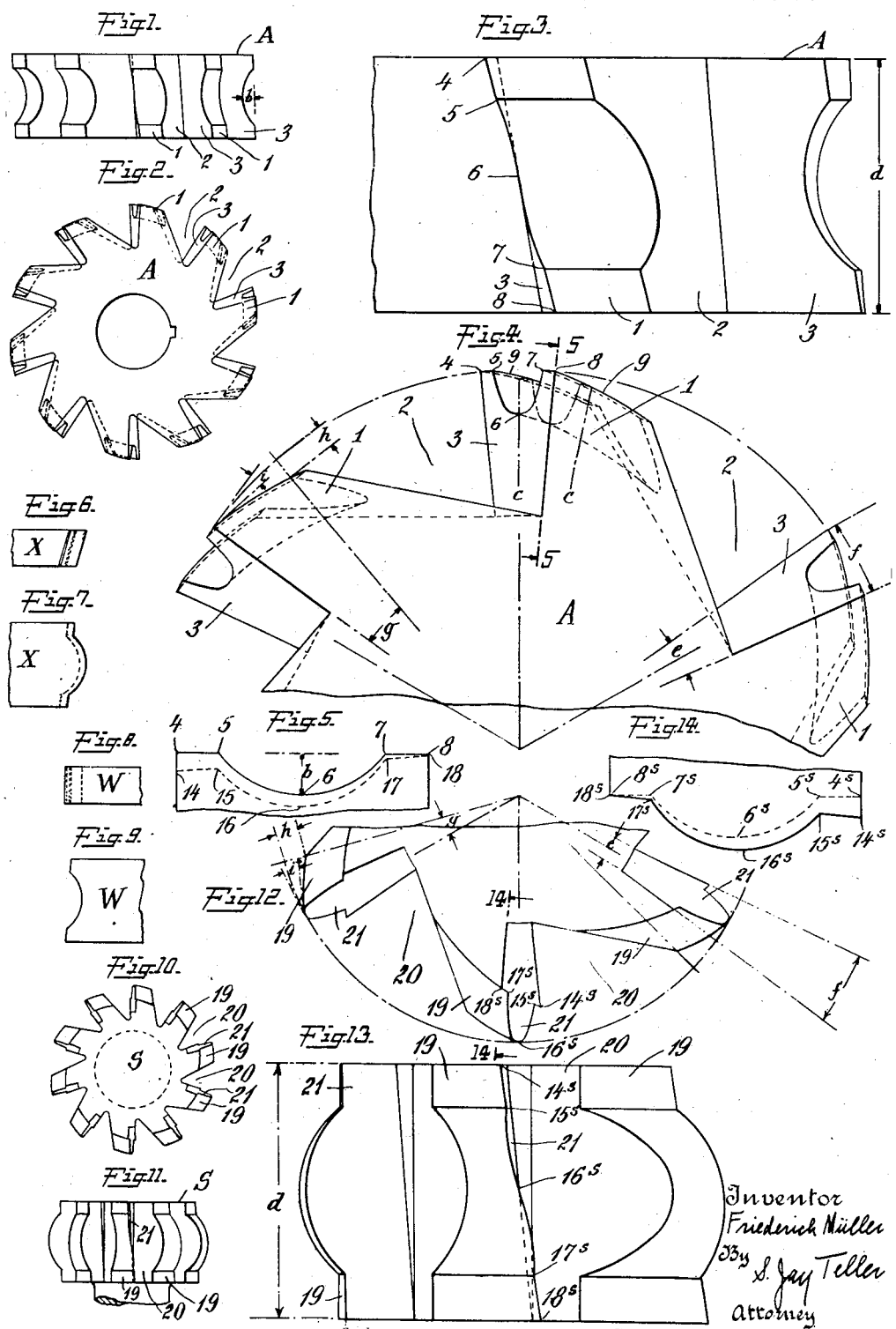
F. MULLER.
METHOD OF MAKING MILLING CUTTERS.
APPLICATION FILED DEC. 26, 1918.
1,348,298.
Patented Aug. 3, 1920.
2 SHEETS—SHEET 1.
Inventor
Friederich Müller
By S. Jay Teller
Attorney

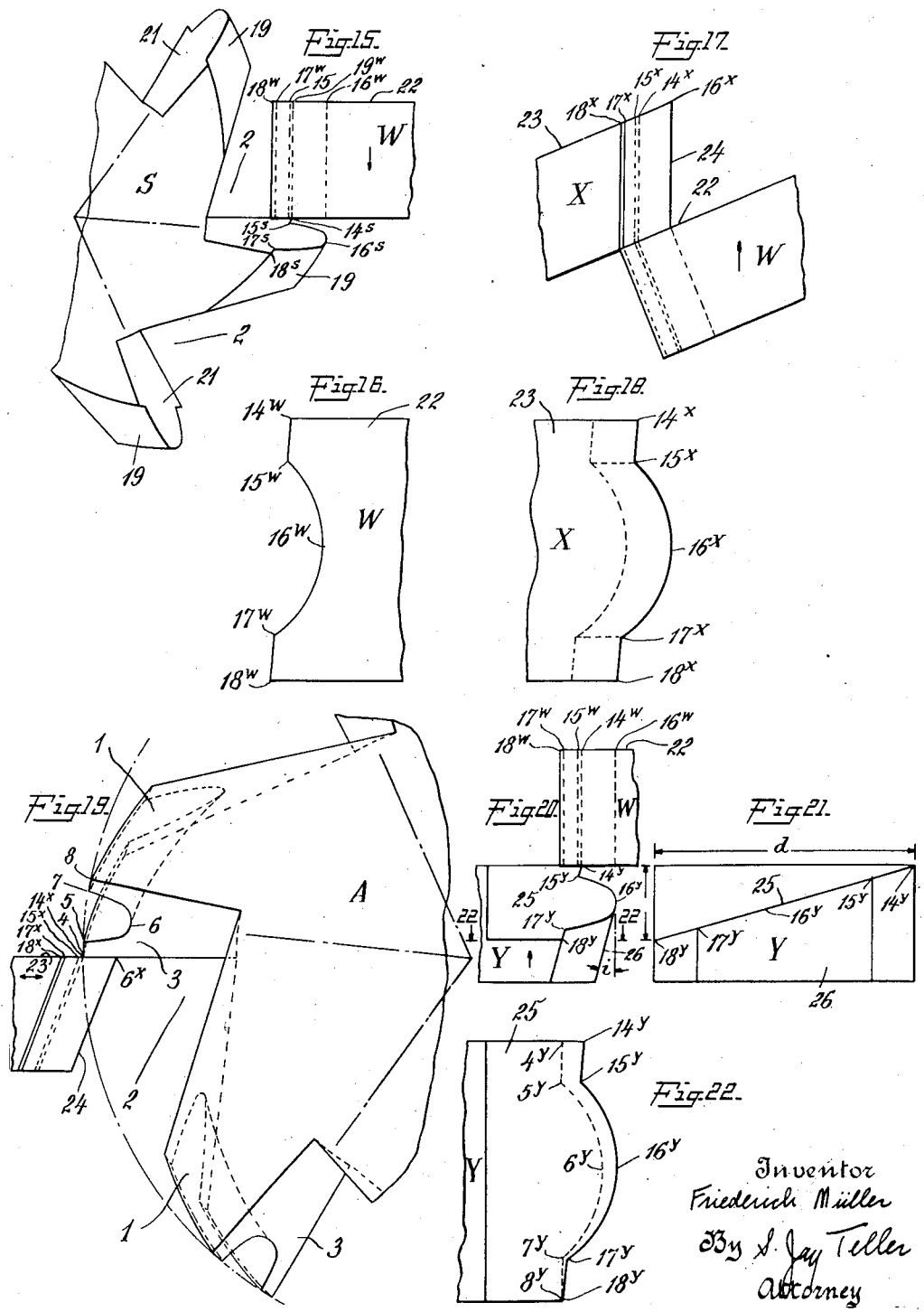

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METHOD OF MAKING MILLING-CUTTERS.

1,348,298.   Specification of Letters Patent.   Patented Aug. 3, 1920.

Application filed December 26, 1918. Serial No. 268,352.

*To all whom it may concern:*

Be it known that I, FRIEDERICH MÜLLER, a citizen of the United States, residing at Hartford, in the county of Hartford and State of Connecticut, have invented certain new and useful Improvements in Methods of Making Milling-Cutters, of which the following is a specification.

It is a well known principle in the art of cutting metals that the cutting edge of the tool should preferably be inclined with respect to the direction of relative movement so as to effect a shearing cut. This inclination is of advantage in that it improves the cutting action and it is also of advantage in that it permits the tool to engage the work gradually and with relatively little shock instead of engaging it suddenly with greater shock. This principle has been applied to relieved milling cutters which are of uniform diameter throughout and has also been applied to milling cutters having a uniform taper from one end to the other. These milling cutters have their cutting edges longitudinally inclined with respect to the axis, the cutting edge usually approximately conforming to a helix. Thus each tooth is enabled to engage the work gradually and to effect a shearing cut.

I have applied this principle to accurately made and properly relieved formed or contour cutters. By a formed or contour cutter I mean one in which the diameter varies from end to end in ways differing from a uniform taper, the cutter being thus adapted to cut a predetermined contour other than a straight-line. Prior to my invention it had not been deemed practical or possible to make such cutters with inclined cutting faces. The said invention is presented and claimed in my copending application for milling cutters, Serial No. 268,349, filed on even date herewith.

In my copending application for methods of making milling cutters, Serial No. 268,-350, filed on even date herewith, I have presented a method of making cutters embodying the invention presented in my said application, Serial No. 268,349, and I have also shown several variations of the said method or alternate ways of practising it. In the present application I set forth two of the alternate forms of the said method presented in my application Serial No. 268,350, and I present relatively broad claims covering both of them and more specific claims covering one of them. The methods herein set forth are under some circumstances preferable to the method presented in the said application Serial No. 268,350, as being the one ordinarily preferred.

In order that the methods may be clearly understood, I have shown in the accompanying drawings a cutter embodying the invention set forth in the aforesaid application Serial No. 268,349. It will be understood, however, that the drawings are for illustrative purposes only and are not to be construed as defining or limiting the scope of the invention, the accompanying claims being relied upon for that purpose. It will be particularly understood that the contour of the cutter shown has been selected merely by way of example and that any practical contour may be substituted for that illustrated.

Of the drawings:

Figures 1 and 2 are plan and end views respectively of a formed milling cutter such as may be made in accordance with the invention.

Figs. 3 and 4 are enlarged fragmentary diagrammatic plan and end views respectively of the milling cutter shown in Figs. 1 and 2. In these views there is shown a smaller number of teeth and the inclination of the cutting faces and the relief are increased in order to bring out the principles of the invention more clearly.

Fig. 5 is a diagrammatic view illustrating certain features of the cutter shown in Figs. 3 and 4.

Figs. 6 and 7 are side and plan views respectively of a lathe tool which may be used for cutting the final milling cutter shown in Figs. 1 and 2.

Figs. 8 and 9 are side and plan views respectively of an intermediate tool which may be used for making the lathe tool shown in Figs. 6 and 7.

Figs. 10 and 11 are end and bottom views respectively of a preliminary milling cutter which may be used for milling the intermediate tool shown in Figs. 8 and 9.

Figs. 12 and 13 are enlarged fragmentary diagrammatic views of the milling cutter shown in Figs. 10 and 11. The cutter is shown as having a smaller number of teeth and as having increased inclination and relief in conformity with the increased inclination and relief shown in Figs. 3 and 4.

Fig. 14 is a diagrammatic view illustrating certain features of the cutter shown in Figs. 12 and 13.

Fig. 15 is an enlarged diagrammatic side view illustrating the milling cutter in use for milling the intermediate tool.

Fig. 16 is a plan view of the intermediate tool on the same scale as Fig. 15.

Fig. 17 is an enlarged diagrammatic side view illustrating the intermediate tool in use for cutting the lathe tool.

Fig. 18 is a plan view of the lathe tool on the same scale as Fig. 17.

Fig. 19 is an enlarged diagrammatic side view illustrating the lathe tool in use for cutting a final milling cutter.

Fig. 20 is an enlarged diagrammatic side view similar to Fig. 14, but illustrating a preliminary reciprocable tool in use for cutting the intermediate tool.

Fig. 21 is an end view of the preliminary tool on the same scale as Fig. 20.

Fig. 22 is a diagrammatic plan view illustrating certain features of the preliminary tool shown in Figs. 20 and 21.

In order that the method may be clearly understood I will first describe a cutter such as can be made in accordance with the invention. Referring particularly to Figs. 1 to 5 of the drawings, it will be seen that I have shown a cutter A which is shaped to cut a predetermined contour differing from a straight line. The cutter is provided with a plurality of generally longitudinal teeth 1 between which are grooves 2, the teeth and grooves being preferably spaced uniformly. The grooves 2 between the teeth can be of any usual or preferred depth and shape, as required by the spacing and by the depth of the contour to be cut. The front wall 3 of each tooth 1 constitutes the cutting face thereof and this cutting face is radial or approximately so in order to provide a satisfactory cutting angle. Each cutting face 3 is inclined or positioned obliquely so that its longitudinal lines lie at angles to the axis of the cutter. Preferably, each tooth 1 is generally helical in form and each cutting face 3 conforms to a helicoid. As illustrated, the helicoid is one formed by a generatrix following the axis of the cutter and also following a helix on a cylinder concentric with the axis thereof, the helicoid in this case being radial. The teeth and the cutting faces may be inclined in either direction and the degree of inclination may be varied as required.

The cutter may be made for cutting any desired practical contour. The contour may be made up of a series of straight lines, or a series of circular arcs, or a combination of circular arcs and straight lines, or the contour may consist in whole or in part of non-circular curves. The cutter shown is adapted for cutting a contour consisting of straight end portions and a convex central portion conforming to a circular arc and having a height $b$. It will be understood that this particular contour has been selected merely by way of example and that the contour can vary in any practical way that may be desired, the method being particularly applicable however for making a cutter having a curved contour.

The outer edge of each cutting face 3 has an outline which is adapted to cut the predetermined contour when the cutter is rotated, this outline of the cutting face following the helicoidal surface thereof. In other words the outer cutting edge of each face is of such form that the projection of the said edge about the axis of the cutter upon an axial plane of intersection is the same as the predetermined contour to be cut. This will be more clearly understood from the diagrammatic views in Figs. 3 and 4. For the particular contour illustrated, the four points 4, 5, 7 and 8 on the outline of the cutting face are all at equal distances from the axis of the cutter; the central point 6 is at a distance from the axis which is less by the distance $b$; and all other points along the outline are at their respective correct distances from the center so that when the cutter is rotated they will define the correct predetermined contour, as shown by full lines in Fig. 5. This relationship of the several points along the outline of the cutting face obtains notwithstanding the fact that the cutting face is a warped or helicoidal surface.

Each tooth of the cutter is relieved along lines 9 extending backward and inward from the outline of the cutting face, these relief lines forming a continuous surface or continuous surfaces which extend from end to end of the cutter. The relief lines are properly constructed notwithstanding the variations in radius at different points along the said outline and notwithstanding the variations in angular position resulting from the warped or helicoidal cutting face. Preferably the relief lines 9 are maintained in similar relationship to each other as they extend backward and inward, the lines conforming to spirals of Archimedes. The result is that each tooth of the cutter, at any axial plane of intersection, such as 5—5, has a distorted shape, as shown by dotted lines in Fig. 5. This distorted shape includes points 14, 15, 16, 17 and 18 corresponding respectively to the points 4, 5, 6, 7 and 8 on the outline of the cutting face. The distortion of shape results from the fact that the successive inward inclined relief lines 9 start at different angular positions because of the inclined or helicoidal cutting face. Therefore with the cutting face inclined in the direction illustrated the several points 17, 16, 15 and 14 to the left of the point 8 or 18 are spaced inward from the respective points 7, 6, 5 and 4 by progressively increasing distances. Notwithstanding this distortion in shape at an axial plane of intersection, the outline or effective contour at the cutting face is correct, as before stated.

When the relief lines 9 conform to spirals and are maintained in similar relationship as they extend backward and inward, as is preferred, it is possible to sharpen or grind the teeth of the cutter on the front cutting faces 3 without changing the effective contour. The teeth present the same effective contour at successive inclined surfaces of intersection similar in form and position to the initial cutting faces 3. At any surface, such as $c$—$c$, back of an initial cutting face 3 and similar to the said face, the same effective contour will be found. Therefore if the teeth are ground on their front faces to helicoids which are the same as the helicoids of the initial cutting faces the effective contour will remain the same.

Taking up now the method of making the milling cutter, it will be understood that the preliminary steps of turning the blank, cutting the grooves therein, etc., can be carried on in any usual or preferred way, these not of themselves constituting any part of the present invention. The invention relates particularly to the method of shaping the blank to provide a distorted shape which will enable it to cut a correct contour.

In accordance with the general method set forth in my aforesaid copending application, Serial No. 268,350, the shape of the cutter to be made is formed by means of a preliminary cutter which may be a milling cutter. In the said application the preliminary cutter is shown acting directly on the final cutter, and is also shown as being used to form a lathe tool which is used to cut the final cutter. The present application relates specifically to the method involving the use of the lathe tool in conjunction with the preliminary cutter.

Figs. 6 and 7 show a lathe tool X such as may be used for cutting the final cutter A; and Figs. 8 and 9 show an intermediate tool W such as may be used for cutting the lathe tool. The preliminary cutter for making the intermediate tool may be a milling cutter S such as shown in Figs. 10 and 11.

A milling cutter such as S is fully described in my aforesaid application Serial No. 268,350, and I will herein confine myself to a brief description of one form of preliminary milling cutter, reference being had to the said application for descriptions of possible variations. For convenience in describing the preliminary milling cutter S I have shown it somewhat diagrammatically and on a larger scale in Figs. 12 to 14. The number of teeth is reduced and the inclination of the cutting faces and the amount of the relief are somewhat increased.

The cutter S is provided with generally longitudinal teeth 19 which are separated by grooves 20 and which have front cutting faces 21. Each tooth of the preliminary cutter S has at any axial plane of intersection such as 14—14 a shape which is the same as the predetermined contour of the cutter A, as shown by dotted lines in Fig. 14. While the contour is the same, it is reversely positioned with respect to the axis, the points which are outermost on the final cutter being innermost on the preliminary cutter and vice versa. The points along this plane of intersection are indicated by $4^s$, $5^s$, $6^s$, $7^s$ and $8^s$, these corresponding respectively to the points 4, 5, 6, 7 and 8 on the effective contour of the final cutter A.

Each cutting face of the preliminary cutter has a degree of inclination which bears a predetermined ratio to the degree of inclination of the cutting face of each tooth of the final cutter A. In the case of a milling cutter such as S having a plurality of teeth with helicoidal cutting faces the "degree of inclination" in each case is represented by the ratio between a unit of length measured parallelly with the axis and longitudinally of the contour and the angular advance of the cutting face corresponding to the said unit of length. The actual angles of inclination with respect to the axis may differ because of different diameters but the degree of inclination, as defined above, may remain the same. With a milling cutter having helicoidal cutting faces the degree of inclination is inversely proportional to the longitudinal pitch of the helicoids, and for the sake of convenience I will refer principally to the longitudinal pitch instead of to the degree of inclination.

Any convenient ratio between the degrees of inclination or between the longitudinal pitches may be selected, but it is usually most convenient to provide the preliminary cutter S with helicoidal surfaces which are constructed with the same degree of inclination, and therefore with the same longitudinal pitch, as that of the helicoidal surfaces of the final cutter A, the ratio in this case being one to one. In this case, as shown in Figs. 10 to 15 of the drawings, the ratio of the degrees of inclination is one to one, and the ratio of the longitudinal pitches is also one to one. The helix along which travels the generatrix of a helicoid of a tooth of the preliminary cutter S, has the same longitudinal pitch as has the corresponding helix for a helicoid of a tooth of the final cutter A.

The preliminary cutter is preferably much smaller in diameter than the final cutter, and when this is the case, as shown in the drawings, there is an apparent difference in the helicoidal surfaces of the two cutters. While the helicoids are in reality the same, being determined by the same or similar directrices, the actual angle of inclination is less for the preliminary cutter S than for the final cutter A because of the smaller diameter. For the cutter A as illustrated in Figs. 3 and 4 the length $d$ of the cutter may be taken as the unit of length, and it will be seen that the corresponding angular advance is represented by $e$. For the cutter S as illustrated in Figs. 12 and 13 the same unit of length $d$ is taken, and the angular advance $e$ is kept the same. The actual linear advance of one end of the cutting face with respect to the other at the outside radius of the cutter A is represented in Fig. 4 by $f$. Taken at the same radius the advance is the same for the cutter S as shown in Fig. 12, but it is less at a smaller radius and the actual angle of inclination of the cutting face is less. For reasons which will presently appear the actual angle of inclination of the cutting face of the preliminary cutter is immaterial, and therefore the diameter of the preliminary cutter S can be varied as desired without interfering with the practice of my method. It is important, however, that the direction of inclination be the same for the preliminary cutter as for the final cutter.

Each tooth of the preliminary cutter has a degree of relief which bears a predetermined ratio to the degree of relief of the teeth of the final cutter. In the case of a milling cutter such as S the "degree of relief" in each case is represented by the ratio between the angular advance of the cutter and the corresponding decrease in radius. In the case of spiral relief, the relief lines for the same degree of relief must always conform to similar spirals constructed about the center. The aforesaid ratio between the degree of relief of the preliminary cutter and the degree of relief of the final cutter must be the inverse of the ratio between the degree of inclination of the cutting faces of the preliminary cutter and the degree of inclination of the cutting faces of the final cutter, or it must be the same as the ratio between the longitudinal pitch of the helicoids of the preliminary cutter and the longitudinal pitch of the helicoids of the final cutter. As before stated, it is usually most convenient to make the degrees of inclination the same, that is to make the two cutting faces correspond to similar helicoids as illustrated in Figs. 10 to 15. In this case the ratio of the degrees of inclination is one to one, and the inverse of this ratio is also one to one. Therefore for this special case the degrees of relief for the two cutters are the same.

As applied to the cutters S and A, the decrease in radius for each increment of angular advance of the cutter S is the same as the decrease in radius for each increment of angular advance of the cutter A. For any angle such as $g$ of either cutter the decrease in radius or the amount of clearance, is $h$. While the degree of relief is the same for both cutters, there is an apparent difference because of the smaller diameter of the cutter S. This causes the relief lines to meet the circumferential lines at a relatively small angle such as $i$ for the cutter A and at a relatively large angle such as $i^s$ for the cutter S, but it will be remembered that the degrees of relief are the same, as before explained.

As the result of the intersection of the helicoidal cutting face of each tooth of the cutter S with the spiral relief lines thereof, the outline or contour of the cutting face is distorted, as shown by full lines in Fig. 14. This distorted contour has points $14^s$, $15^s$, $16^s$, $17^s$ and $18^s$, all points $17^s$, $16^s$, $15^s$ and $14^s$ to the right of the point $8^s$ or $18^s$ being spaced outward from the respectively corresponding points $7^s$, $6^s$, $5^s$ and $4^s$ by progressively increasing distances. Inasmuch as the teeth of the preliminary cutter S are provided with helicoidal cutting faces having the same pitch as the helicoidal cutting faces of the teeth of the final cutter A and are provided with the same degree of relief as the teeth of the final cutter the extent of distortion is the same as that of the cutter A at an axial plane of intersection. The actual inclination of each cutting face of the cutter S is less by reason of the smaller diameter but the amount of relief is more for the same reason, and these differences exactly compensate for each other.

The preliminary milling cutter S may be used directly to mill the final cutter. However, this results in a slight error which requires correction, as set forth in my application Serial No. 268,350. When the preliminary cutter is used directly for milling the final cutter, it is made as small as possible in order to avoid interference with the front of one tooth while finishing the back of the preceding tooth. Frequently, however, it is impossible to avoid such interference, particularly when there is considerable depth of contour, or when the cutting faces are sharply inclined, or when the degree of relief is large. In such cases it is necessary to make use of a lathe tool such as X which can be quickly withdrawn and which of course has no parts located beyond the cutting plane, as is the case with a rotating milling cutter. The lathe tool has the additional advantage that no correction is required.

While not herein specifically illustrated, a cutter made by means of a lathe tool in the manner to be described may have parts of its contour sharply inclined with respect to the axis, and the outer relieved surface of each tooth may extend backward toward the next following tooth to an extent beyond that to which it could be cut by a preliminary shaped milling cutter such as S. A cutter of this type is set forth in my copending application for milling cutters, Serial No. 368,928, filed March 26th, 1920.

When a lathe tool is to be used the preliminary cutter S is used to mill the intermediate tool W as shown in Fig. 15, providing the said tool at its cutting face 22 with a distorted contour which is the same as the effective contour of the cutter S shown by full lines in Fig. 14. This distorted contour is illustrated in the plan view in Fig. 16, the contour having points $14^w$, $15^w$, $16^w$, $17^w$ and $18^w$ corresponding respectively to the points $14^s$, $15^s$, $16^s$, $17^s$ and $18^s$ of the effective contour of the cutter S. It will be observed that the tool W is formed without relief, it being fed perpendicularly to its cutting face 22, as indicated by the arrow in Fig. 15.

The intermediate tool W is used, as shown in Fig. 17, for cutting the lathe tool X. The tool X has a cutting face 23 and has its front face 24 inclined with respect to the cutting face to provide the necessary relief. The tool W is set with its cutting face 22 parallel with the cutting face 23 of the tool X, and relative reciprocation is then effected along lines parallel with the front face 24. The result is that the cutting face 23 is formed with a distorted contour which is exactly the same as the distorted contour of the face 22 of the tool W. This distorted contour is shown in Fig. 18 and it has points $14^x$, $15^x$, $16^x$, $17^x$ and $18^x$ corresponding respectively to the points $14^w$, $15^w$, $16^w$, $17^w$ and $18^w$ of the cutter W.

Fig. 19 shows the tool X being used for shaping the cutter A. It will be understood that the blank is rotated as indicated by the arrow and that tool X is moved inward and outward in timed relation to the rotation to provide relief. The distortion of the shape of the tool X is just sufficient to offset the distortion which would otherwise take place in the cutter A, and the result is that the cutter A is formed with the correct effective contour.

The intermediate tool W can also be made by the use of a preliminary reciprocable cutter in lieu of the preliminary milling cutter, shown in Fig. 15. Figs. 20 to 22 show a reciprocable cutter or tool Y such as may be used. This tool is adapted to be reciprocated along straight lines, as indicated by the vertical arrow in Fig. 20. At a plane such as 22—22 transverse to the lines of reciprocation, the tool has a shape which is the same as the predetermined contour to be cut by the final cutter A. This is shown by dotted lines in Fig. 22 in which the points $4^y$, $5^y$, $6^y$, $7^y$ and $8^y$ correspond respectively to the points $4^s$, $5^s$, $6^s$, $7^s$ and $8^s$ of the cutter S, as shown in Fig. 15. The top face 25 of the tool is inclined, as shown in Fig. 21. The front face 26 of the tool is also beveled or inclined, as shown in Fig. 20, to provide the required relief.

The top face 25 of the tool Y has a degree of inclination which bears a predetermined ratio to the degree of inclination of the cutting face of each tooth of the final cutter A. In the case of a reciprocable tool, the degree of inclination is represented by the ratio between a unit of length measured longitudinally of the contour and transversely of the lines of movement and the amount of rise corresponding to the said unit of length and measured parallelly with the lines of movement. Any convenient degree of inclination may be selected but I have shown a degree of inclination the same as that of the cutters A and S. Taking the width $d$ of the tool as the unit of length it will be seen that the corresponding amount of rise is $f$, which is the same as the advance or rise for the cutter A at the outside radius thereof.

The front face 26 has a degree of relief which bears a predetermined ratio to the degree of relief of the final cutter. In the case of a reciprocable tool such as Y, the degree of relief is represented by the ratio between a unit of length measured parallelly with the lines of movement and the corresponding amount of clearance. If the degree of relief is the same as for the final cutter, as shown, the degree of relief is also the same. Inasmuch as the rise $f$ for the tool Y is the same as the advance or rise for the cutter A at the outside radius, the front face is given an amount of clearance which is the same as that of the cutter A at the outside radius thereof. In other words the tool is given a relief angle $i$ which is the same as that of the cutter A at the outside radius thereof. As the result of the intersection of the inclined cutting face 25 with the inclined front face 26, the outline or contour of the cutting face 25 is distorted as shown by full lines in Fig. 22. This distorted contour has points $14^y$, $15^y$, $16^y$, $17^y$ and $18^y$ which correspond exactly to the points $14^s$, $15^s$, $16^s$, $17^s$ and $18^s$ of the preliminary milling cutter S, as shown by full lines in Fig. 14.

The tool Y is used to make the tool W as shown in Fig. 20, the tool W being given exactly the same contour as by the method illustrated in Fig. 15. The tool W can then be used as before described, the subsequent steps being as shown in Figs. 17 to 19.

The method involving the use of a preliminary reciprocable cutter is presented in my copending application for methods of making milling cutters, Serial No. 268353, filed on even date herewith.

What I claim is:

1. The herein described method of shaping a relieved milling cutter adapted to cut a predetermined contour other than a straight line and having cutting faces inclined with respect to the axis, the method consisting in forming a preliminary cutter having the correct predetermined contour at planes of intersection transverse to the lines of cutting and provided with a cutting face with a degree of inclination bearing a predetermined ratio to the degree of inclination of the cutting faces of the final cutter and provided with a degree of relief bearing a ratio to the degree of relief of the teeth of the final cutter which is the inverse of the ratio between the degrees of inclination, in forming a lathe tool from the said preliminary cutter, and in cutting the relieved final milling cutter by means of the said lathe tool whereby the final cutter is formed with a distorted shape at axial planes of intersection but is adapted to cut the correct contour when rotated.

2. The herein described method of shaping a relieved milling cutter adapted to cut a predetermined contour other than a straight line and having cutting faces inclined with respect to the axis, the method consisting in forming a preliminary milling cutter having the correct predetermined contour at longitudinal planes of intersection transverse to the lines of cutting and having its teeth provided with cutting faces with a degree of inclination bearing a predetermined ratio to the degree of inclination of the cutting faces of the final cutter and provided with a degree of relief bearing a ratio to the degree of relief of the teeth of the final cutter which is the inverse of the ratio between the degrees of inclination, in forming a lathe tool from the said preliminary milling cutter, and in cutting the relieved final milling cutter by means of the said lathe tool whereby the final cutter is formed with a distorted shape at axial planes of intersection but is adapted to cut the correct contour when rotated.

3. The herein described method of shaping a spirally relieved milling cutter adapted to cut a predetermined contour other than a straight line and having helicoidal cutting faces, the method consisting in forming a preliminary milling cutter having the correct predetermined contour at axial planes of intersection and having its teeth provided with helicoidal cutting faces with a longitudinal pitch bearing a predetermined ratio to the longitudinal pitch of the helicoidal cutting faces of the final cutter and provided with a degree of spiral relief bearing the same predetermined ratio to the degree of spiral relief of the teeth of the final cutter, in forming a lathe tool from the said preliminary milling cutter, and in cutting the relieved final milling cutter by means of the said lathe tool whereby the final cutter is formed with a distorted shape at axial planes of intersection but is adapted to cut the correct contour when rotated.

4. The herein described method of shaping a spirally relieved milling cutter adapted to cut a predetermined contour other than a straight line and having helicoidal cutting faces, the method consisting in forming a preliminary milling cutter having the correct predetermined contour at axial planes of intersection and having its teeth provided with helicoidal cutting faces with a longitudinal pitch the same as the longitudinal pitch of the helicoidal cutting faces of the final cutter and provided with a degree of spiral relief the same as the degree of spiral relief of the teeth of the final cutter, in forming a lathe tool from the said preliminary milling cutter, and in cutting the relieved final cutter by means of the said lathe tool whereby the final milling cutter is formed with a distorted shape at axial planes of intersection but is adapted to cut the correct contour when rotated.

5. The herein described method of shaping a spirally relieved milling cutter adapted to cut a predetermined contour other than a straight line and having helicoidal cutting faces, the method consisting in forming a preliminary milling cutter having the correct predetermined contour at axial planes of intersection and having its teeth provided with helicoidal cutting faces with a longitudinal pitch bearing a predetermined ratio to the longitudinal pitch of the helicoidal cutting faces of the final cutter and provided with a degree of spiral relief bearing the same predetermined ratio to the degree of spiral relief of the teeth of the final cutter, in milling an intermediate tool with the said preliminary milling cutter, in cutting a lathe tool with the said intermediate tool, and in cutting the relieved final milling cutter by means of the said lathe tool whereby the final cutter is formed with a distorted shape at axial planes of intersection but is adapted to cut the correct contour when rotated.

6. The herein described method of shaping a spirally relieved milling cutter adapted to cut a predetermined contour other than a straight line and having helicoidal cutting faces, the method consisting in forming a preliminary milling cutter having the correct predetermined contour at axial planes of intersection and having its teeth provided with helicoidal cutting faces with a longitudinal pitch bearing a predetermined ratio to the longitudinal pitch of the helicoidal cutting faces of the final cutter and provided with a degree of spiral relief bearing the same predetermined ratio to the degree of spiral relief of the teeth of the final cutter, in using the said preliminary milling cutter to mill an intermediate tool without relief, in cutting a relieved lathe tool with the said intermediate tool, relative reciprocation being effected with the cutting faces of the two tools in parallelism, and in cutting the relieved final milling cutter by means of the said lathe tool whereby the final cutter is formed with a distorted shape at axial planes of intersection but is adapted to cut the correct contour when rotated.

In testimony whereof, I hereto affix my signature.

FRIEDERICH MÜLLER.